Patented Feb. 22, 1949

2,462,631

UNITED STATES PATENT OFFICE 2,462,631

COATING COMPOSITIONS

Lewis D. Gittings and Robert H. Fundaburk, Anniston, Ala., assignors to Monsanto Chemical Company, St. Louis, Mo., a corporation of Delaware No Drawing. Application March 13, 1944, Serial No. 526,332

14 Claims. (Cl. 106—239)

This invention relates to plasticized rosin compositions and more particularly to coating compositions containing the same.

An object of the invention is to provide a plasticized rosin composition which is suitable for use as a sizing material or as a primer for plaster, building tiles, cement mortar, concrete, bricks, stone, walls coated with cold-water paint, walls coated with asphalt paint and the like.

Another object is to provide a plasticized rosin composition which is adapted for use as a shellac substitute.

A further object is to provide an improved vehicle for enamels, paints, varnishes and coating compositions generally.

A still further object is to provide an aluminum paint of high opacity, high reflectivity, low emissivity, high moisture-proofing efficiency and great durability.

Another object is to provide a graphite paint which protects iron, steel and metals generally against the action of air, moisture and acid fumes.

An additional object is to provide a paint of improved stability against settling.

Other objects will be apparent to those skilled in the art as the description proceeds.

In the past it has generally been found necessary to size or apply a priming coating to porous bases such as plaster, building tiles, cement mortar, concrete, bricks, stone and walls coated with a cold-water paint or a bituminous paint prior to treating these bases with another coat of paint. If, for example, a porous base is coated directly with paint without the use of a suitable sizing material or primer the capillary action of the numerous pores in the base separates the vehicle from the paint with the result that the pigment loses its capacity to adhere to the base and scales off in a relatively short time. Bituminous paints have been used to some extent as primers or as sizes to combat the capillary action of the porous base and while some measure of success has been attained in this manner, this method of operation has been unsatisfactory because bituminous paints dissolve in, bleed through and stain the surface of the subsequently applied paint. A similar problem is also involved when creosoted wood is directly coated with paint as the creosote bleeds through and stains the surface thereof.

In connection with walls coated with cold-water paints the practice has been to either remove the cold-water paint or treat it with a sizing composition which will firmly bind the paint to the wall so that it will not dust off and carry with it the paint that has been subsequently applied. While the sizing compositions of the prior art have enjoyed some success, they have not been entirely satisfactory and our invention includes as one of its objects a satisfactory solution of this problem.

Now we have found that if rosin is mixed with a compound selected from the group consisting of biphenyl, ortho-terphenyl and meta-terphenyl and the mixture heated to a clear melt, followed by the addition of a suitable amount of solvent to reduce the product to the desired viscosity, a plasticized rosin composition is obtained which is eminently suitable for sizing porous bases of the type described above and for priming surfaces coated with cold-water and bituminous paints.

In addition to the above-mentioned materials, mixtures of biphenyl with ortho-terphenyl or meta-terphenyl, mixtures of ortho- and meta-terphenyls, and mixtures of biphenyl, ortho-terphenyl and meta-terphenyl may be used to plasticize rosin. In view of its insolubility in organic solvents generally, para-terphenyl is not a suitable plasticizer for rosin. It may, however, be used in very small amounts (not over about 2%) in combination with one or more of the above hydrocarbons. In general where ortho-terphenyl is employed in combination with meta-terphenyl alone or with meta-terphenyl containing only small amounts of para-terphenyl, it should constitute at least 40% of the plasticizing mixture. The only other requirement which must be met by the above plasticizing mixtures is that the components thereof should be combined in such proportions that after fusion with rosin they will dissolve in the solvent used to prepare the coating composition.

Our invention is illustrated but not limited by the following examples:

*Example I*

21 pounds of rosin was intimately mixed with 7 pounds of a hydrocarbon composition consisting essentially of a eutectic mixture of ortho-terphenyl and biphenyl which mixture also contains relatively small amounts of meta-terphenyl and traces of para-terphenyl and other high boiling hydrocarbons. The mixture was heated to a clear melt and then dissolved in about 1.3 liters of mineral spirits. The product thus obtained was applied as a size or as a priming coating to plaster, building tile, cement mortar, and walls coated with cold-water and asphalt paints. These pretreated bodies were then coated with a standard oil paint and practically six months have passed without any evidence of the pigment scaling off, of the asphalt paint bleeding through the oil paint or of the oil paint dusting off with the cold-water paint.

Samples of the same materials were coated directly with the standard oil paint and subjected to the same conditions and in all instances there is considerable evidence of the pigment flaking off and also evidence of the asphalt paint bleeding through the oil paint.

The following example illustrates the method used for preparing our shellac substitute and demonstrates the superiority of our product over shellac.

Example II 4 ounces of ortho-terphenyl was mixed and fused with 12 ounces of rosin and then the fused mixture was reduced in viscosity by the addition of 454 c.c. of mineral spirits.

95 c.c. of the above composition was incorporated with 5 to 10 c.c. of Sherwin Williams japan drier No. 64 and the product was coated on an oak board.

90 c.c. of a composition prepared in a similar manner from 4 ounces of ortho-terphenyl, 12 ounces of rosin and 250 c.c. of benzene was incorporated with 10 c.c. of the above japan drier and this product was applied to an oak board in the form of a coating.

A spot test with water was made on both coatings and compared with a similar test made with shellac. The shellac coating proved to be a complete failure, whereas the other coatings displayed no spotting at all.

In each case the rosin-terphenyl compositions produced a heavier coating, a more glossy surface and a greater penetration into the wood than shellac. The compositions sanded smoothly and they did not darken the wood any more than shellac.

In addition to its use as a sizing composition, a priming composition and as a shellac substitute, our plasticized product is an excellent vehicle for paints and coating compositions generally. The following examples illustrate the use of our product as a paint vehicle.

Example III 1 gallon of the composition prepared by the method described in Example I was intimately mixed with 2 pounds of aluminum pigment and the aluminum paint thus produced was characterized by high opacity, high reflectivity, low emissivity, high moisture-proofing efficiency, resistance to weathering and great durability.

The above described paint and a standard aluminum paint (Glidden's high degree heat resisting aluminum bronze paint) have been applied to the outside surfaces of ceramic kilns and their stacks and other equipment operating at elevated temperatures. In each case our paint proved superior to the standard in heat resistivity.

The standard paint and the above described aluminum paint were also applied to a number of steel stacks of a chemical plant, which stacks were exposed to elevated temperatures, atmospheric conditions and acid fumes and in all cases our aluminum paint compared favorably with or was superior to the standard paint.

Example IV 4 ounces of ortho-terphenyl was melted with 12 ounces of rosin and the plasticized mixture was then dissolved in 454 c.c. of mineral spirits. 8 ounces of aluminum pigment was thoroughly mixed with the vehicle thus produced to form an aluminum paint.

The aluminum paint was applied to the outside of a drying oven, the temperature of which was about 45 to 50° C. A standard aluminum paint was also applied for comparison and after six months exposure to the same conditions, our paint compares favorably with the standard paint.

Example V 4 ounces of meta-terphenyl was melted with 12 ounces of rosin and the plasticized mixture was added to 454 c.c. of mineral spirits. The solution was then filtered to remove the solid matter which was discarded. 8 ounces of aluminum pigment was added to and thoroughly mixed with the filtrate. The paint thus prepared was tested in the manner described in Example IV with similar results.

Example VI

An aluminum paint was prepared by the procedure described in Example IV using 4 ounces of diphenyl instead of ortho-terphenyl. This paint was also tested in the manner described in Example IV and it was found to compare favorably with the standard aluminum paint.

Our aluminum paint may be used not only for the purpose illustrated in the above examples but also for coating metals generally, for coating wood, cement, concrete, brick, stone and many other materials. It also has many specific applications such as: coating bridges, water tanks, oil tanks, wooden tanks, telephone exchange equipment, walls and ceilings, radiators, transformers, creosoted wood and dirigible docks. It may also be used as a priming coating for the above materials and due to its high impermeability it may be applied over bituminous paints without encountering the phenomenon known as "bleeding."

The vehicle used in the production of my aluminum paint fully meets the requirements of the paint industry. When mixed with the proper amount of pigment, the paint spreads and covers satisfactorily, has a satisfactory appearance, dries to a tough, durable film and exhibits the desired protective action. It has the proper "body" or viscosity and it flows and levels properly. It also has a sufficiently high yield value and plasticity so that, when applied to a smooth, vertical surface, it does not run, sag, or break, but sets and dries to a smooth uniform film.

Example VII 3 pounds of lithopone was milled in a ball mill for 3 hours with 3½ pounds of the vehicle prepared according to Example I. The paint thus produced was applied to the walls of shower bath stalls and then subjected to the action of steam and soap. Similar tests were made with a standard paint and in every instance the standard paint displayed a tendency to flake off, whereas the above paint showed no evidence of failure.

Example VIII 30 parts by weight of air spun graphite was thoroughly mixed with 70 parts by weight of a vehicle prepared in accordance with the procedure set forth in Example I. The graphite paint thus formed was applied to a portion of a piece of steel and then the piece of steel was heated to a temperature of 600 to 650° C. for 3 hours. The coated portion of the steel was dusted off and it showed no evidence of oxidation, whereas the uncoated portion of the steel was badly oxidized.

A similar graphite paint was prepared using 12 parts of graphite and 47 parts of vehicle. This paint was applied to a piece of jacketed iron and then the coated metal was heated to dry the coating.

A spot test using concentrated hydrochloric acid was made on the coating and it was found to be resistant thereto.

The graphite paints described above are suitable for use as protective coatings for metals generally and particularly steel stacks found in chemical plants where resistance to oxidation and acid fumes is required. They are also very valuable for covering metal surfaces and roofs in a smoke laden atmosphere as well as structural steel work in all its various forms.

Example IX 100 c. c. of a vehicle prepared by fusing 4 ounces of ortho-terphenyl with 12 ounces of rosin and dissolving the fused product in 454 c. c. of mineral spirits was intimately mixed with 30 grams of red oxide of iron to form an enamel.

When applied to wood or metal it yields a smooth, glossy, durable and non-brittle film which is firmly united to the base. When coating metals the enamel does not require the use of a priming coating and when applied to wood it effectively fills the pores and it does not come away from the edges of the wood upon drying.

Example X 55 parts by weight of a vehicle prepared in accordance with Example I was intimately mixed with 45 parts of a mixed pigment of the following composition to form a white paint:

|  | Per cent |
| --- | --- |
| Titanox A | 30 |
| Titanox RCHT | 20 |
| Zinc oxide | 40 |
| Asbestine | 10 |

The above paint stays in suspension remarkably well. As an example of its stability a sample of the paint which has been standing for about five months shows substantially no separation of the pigment. The above composition is useful both as an interior and as an exterior paint.

In all of the examples given above any one of the hydrocarbons of the group consisting of biphenyl, ortho-terphenyl and meta-terphenyl or mixtures thereof may be used. Furthermore, the quantity of hydrocarbon and rosin used may vary widely so long as they are combined in proportions which are mutually compatible.

Mineral spirits and benzene have been mentioned as suitable solvents, but toluene, xylene and any other material which will dissolve both the rosin and the hydrocarbon plasticizer may be employed.

From the foregoing detailed description of the present invention it will be apparent that many variations may be made without departing from the spirit and scope thereof. Thus, for example, although we have only mentioned metallic aluminum specifically, it will be evident that the use of other metallic pigments such as copper, copper alloys, gold, lead, nickel, silver and tin is within the scope of our invention. Furthermore, instead of employing the non-metallic paint and enamel pigments specified in the above examples, other pigments may be employed such as chrome yellows, chrome oranges, molybdate chrome orange, chrome greens, cadmium yellows of the lithopone type, precipitated black iron oxide, chromium oxide, hydrated chromium oxide, ultramarine blue, cobalt blue, zinc oxide, zinc sulfide, titanium oxide, titanium-barium pigment, titanium-calcium pigment, lead titanate, titanated lithopone, antimony trioxide, barium sulfate, carbon black, lamp black, bone black, basic lead carbonate and basic lead sulfate, etc. Moreover, in place of rosin it should be understood that rosin derivatives such as polymerized rosins, rosin esters, hydrogenated rosin and various forms of stabilized and heat treated rosins may be used. In fact, any modification of rosin which is compatible with biphenyl, terphenyls or mixtures thereof is within the scope of our invention.

What we claim is:

1. A plasticized composition comprising a rosin plasticized with at least one member of the group consisting of biphenyl, ortho-terphenyl, and meta-terphenyl.

2. A plasticized composition comprising a polymerized rosin plasticized with at least one member of the group consisting of biphenyl, ortho-terphenyl and meta-terphenyl.

3. A plasticized composition comprising a rosin plasticized with biphenyl.

4. A plasticized composition comprising a rosin plasticized with ortho-terphenyl.

5. A plasticized composition comprising a rosin plasticized with meta-terphenyl.

6. A plasticized composition comprising a rosin plasticized with a hydrocarbon mixture consisting essentially of ortho-terphenyl and a relatively small amount of meta-terphenyl and biphenyl.

7. A coating composition comprising a solution in an organic solvent of a rosin plasticized with at least one member of the group consisting of biphenyl, ortho-terphenyl and meta-terphenyl.

8. A paint vehicle comprising a solution in an organic solvent of a rosin plasticized with a hydrocarbon composition consisting essentially of a eutectic mixture of ortho-terphenyl and biphenyl together with a relatively small amount of meta-terphenyl and a trace of para-terphenyl.

9. A paint comprising a pigment carried by a vehicle including a solution in an organic solvent of a rosin plasticized with at least one member of the group consisting of biphenyl, ortho-terphenyl and meta-terphenyl.

10. An aluminum paint comprising an aluminum pigment carried by a vehicle including a solution in an organic solvent of a rosin plasticized with at least one member of the group consisting of biphenyl, ortho-terphenyl and meta-terphenyl.

11. A graphite paint comprising finely divided graphite carried by a vehicle including a solution in an organic solvent of a rosin plasticized with at least one member of the group consisting of biphenyl, ortho-terphenyl and meta-terphenyl.

12. A paint comprising a titanium pigment carried by a vehicle including a solution in an organic solvent of a rosin plasticized with at least one member of the group consisting of biphenyl, ortho-terphenyl and meta-terphenyl.

13. A shellac substitute comprising a solution in an organic solvent of a rosin plasticized with at least one member of the group consisting of biphenyl, ortho-terphenyl and meta-terphenyl, said solution also containing a japan drier.

14. An aluminum paint comprising an aluminum pigment carried by a vehicle including a solution in mineral spirits of a rosin plasticized with a hydrocarbon composition consisting essentially of a eutectic mixture of ortho-terphenyl and biphenyl together with a relatively small amount of meta-terphenyl and a trace of para-terphenyl.

LEWIS D. GITTINGS.
ROBERT H. FUNDABURK.

(References on following page)

REFERENCES CITED

The following references are of record in the file of this patent:

UNITED STATES PATENTS

| Number | Name | Date |
|---|---|---|
| 1,441,181 | Sheppard | Jan. 2, 1923 |
| 1,835,105 | Weber | Dec. 8, 1931 |
| 1,958,711 | Murray | May 15, 1934 |
| 1,958,714 | Richardson | May 15, 1934 |
| 2,172,391 | Krase | Sept. 12, 1939 |
| 2,327,007 | Bent | Aug. 17, 1943 |

OTHER REFERENCES

"Aluminum Paint and Powder," by Edwards, Reinhold Publishing Co., 1936, page 61.